(12) United States Patent
Heren (10) Patent No.: US 8,448,431 B2
(45) Date of Patent: May 28, 2013

(54) HYDRAULIC CIRCUIT ADAPTED FOR COUPLING MOTORS

(75) Inventor: Jean Heren, Margny les Compiegne (FR)

(73) Assignee: Poclain Hydraulics Industrie, Verberie (FR)

( * ) Notice: Subject to any disclaimer, the term of this patent is extended or adjusted under 35 U.S.C. 154(b) by 782 days.

(21) Appl. No.: 12/699,197

(22) Filed: Feb. 3, 2010

(65) Prior Publication Data
US 2010/0192564 A1    Aug. 5, 2010

(30) Foreign Application Priority Data

Feb. 4, 2009  (EP) .................................... 09152069
Apr. 15, 2009  (FR) .................................... 09 52460

(51) Int. Cl.
*F16D 31/02*  (2006.01)
(52) U.S. Cl.
USPC ................................ 60/424; 60/487; 60/488
(58) Field of Classification Search
USPC .................... 60/424, 484, 487, 488
See application file for complete search history.

(56) References Cited

U.S. PATENT DOCUMENTS

| 6,662,557 | B1 | 12/2003 | Cunningham et al. | |
|---|---|---|---|---|
| 7,000,386 | B1 * | 2/2006 | Morgan | 60/489 |
| 8,333,069 | B2 * | 12/2012 | Heren et al. | 60/484 |

FOREIGN PATENT DOCUMENTS

| EP | 0 547 947 A1 | 6/1993 |
|---|---|---|
| EP | 0 921 309 A1 | 6/1999 |

* cited by examiner

*Primary Examiner* — Michael Leslie
(74) *Attorney, Agent, or Firm* — Ladas & Parry LLP (57) ABSTRACT

A hydraulic circuit including: at least one primary motor comprising at least first and second distinct sub-motors, the first sub-motor having a first main orifice, and the second sub-motor having a second main orifice; and at least one secondary motor;
in which circuit said first main orifice of the primary motor(s) is connected to a first main orifice of the secondary motor(s) via a first series duct, and the second main orifice of the primary motor(s) is connected to a second main orifice of the secondary motor(s) via a second series duct.

This configuration of circuit makes coupling possible between the primary motor(s) and the secondary motor(s).

15 Claims, 6 Drawing Sheets

HYDRAULIC CIRCUIT ADAPTED FOR COUPLING MOTORS

FIELD OF THE INVENTION

The invention relates to synchronizing hydraulic motors, and in particular motors connected to rotary drive members such as the wheels of a vehicle.

BACKGROUND OF THE INVENTION

In general, hydraulic motors are used for driving a rotary member such as a wheel, a roller of a roller compactor, a crawler track, etc. Usually, the outlet shaft drives one or more wheels of a vehicle.

It is frequent for it to be necessary to synchronize the speed of rotation of the various rotary members driven by the motors. For example, in a vehicle driven by two wheels disposed on a common axle, it is necessary for said wheels to rotate at the same speed, at least most of the time.

When the driven rotary members are wheels, they are not necessarily wheels that are situated at the opposite ends of the same axle of a vehicle. They may be any wheels that are to be synchronized. In particular, they may be two wheels disposed on the same side of a vehicle. The motors may then be motors used to drive the crawler tracks of a crawler vehicle.

The invention is also applicable to circuits in which the motors do not drive drive members, but rather tools, for example. For simplification reasons, the following explanations are given with reference to wheels being the rotary members driven by the motors, without this constituting a limitation on the scope of the invention.

For synchronizing or coupling a group of hydraulic motors, it is known that a hydraulic transmission device can be implemented that includes a circuit dedicated to synchronization, in which the feed and discharge orifices of a sub-motor of each of the synchronized motors are connected together so as to constitute a loop, i.e. a closed circuit. U.S. Pat. No. 6,662,557 describes such a device.

Unfortunately, that device suffers from the drawback that the hydraulic fluid contained in the synchronization circuit heats up, and that heating can have damaging consequences for the hydraulic transmission device. In addition, due to the head loss in the synchronization circuit, that transmission device has low efficiency.

In addition, that transmission device does not guarantee uniform distribution of power. Only one half of the sub-motors are used to distribute the drive power, the other half being assigned to synchronization. Certain sub-motors are thus used to a much greater extent than others, and the overall life of the transmission device is therefore shortened.

Finally, the hydraulic transmission device that is described is only for synchronizing motors that are made up of two sub-motors each. No solution is proposed for synchronizing motors that are not made up of a plurality of sub-motors.

European Patent EP 0 547 947 describes a hydraulic circuit for driving front and rear wheels of a vehicle. That circuit is proposed for the purpose of providing coupling between the motors connected to the various wheels of a vehicle, in order to prevent the wheels from spinning.

Unfortunately, in that circuit, the drive power is distributed non-uniformly between the various motors or sub-motors. In particular, at least one sub-motor of one of the motors is connected directly to the main orifices of the pump. A priori, it cannot therefore deliver high torque. Conversely, that sub-motor is subjected to relatively high mechanical stress, due to the large pressure difference between its main orifices; and there is a non-negligible risk of the wheel that it drives spinning, on slippery terrain.

The invention applies to a hydraulic circuit including:
 at least one primary motor comprising at least first and second distinct sub-motors, the first sub-motor having a feed or discharge first main orifice, and the second sub-motor having a feed or discharge second main orifice; and
 at least one secondary motor;
in which circuit said first main orifice of said at least one primary motor is connected to a first main orifice of said at least one secondary motor via a first series duct.

OBJECT AND SUMMARY OF THE INVENTION

An object of the invention is to make coupling possible between said at least one primary motor and said at least one secondary motor, without giving rise to a risk of overheating, and while guaranteeing quite uniform distribution of the drive power between the various motors and/or sub-motors, in order to make it possible to achieve excellent drive of the members driven by the motors (i.e. excellent drivability, for a vehicle), with a low risk of wheel spin, and low wear on the motors.

This object is achieved by the fact that the second main orifice of said at least one primary motor is connected to a second main orifice of said at least one secondary motor via a second series duct.

It should be noted in this text that the term "main orifice" designates an internal or external orifice of a motor or of a sub-motor, via which orifice most of the fluid feed and/or of the fluid discharge passes for said motor or sub-motor. In the meaning of the present invention, a sub-motor of a hydraulic motor has two main orifices. The sub-motor may also have secondary orifices for making it possible to remove a leakage flow in the event of excessive pressure, to take measurements of various magnitudes, etc.

An advantage of the structure of the circuit of the invention is that the following two relationships are satisfied (it is assumed that there are a plurality of primary and secondary motors, but the relationships are also satisfied if there is only a single primary motor and/or only a single secondary motor):
 the total flow-rate of fluid of the first sub-motors of the primary motors that is exchanged via the first main orifices of the primary motors is equal to the total flow-rate of fluid that is exchanged with the first main orifices of the secondary motors; and, furthermore,
 the total flow-rate of fluid of the second sub-motors of the primary motors that is exchanged via the second main orifices of the primary motors is equal to the total flow-rate of fluid exchanged with the second main orifices of the secondary motors.

The two preceding relationships between the flow-rates correspond to two equivalent relationships between the speeds of rotation of the primary motors and of the secondary motors, due to the fact that, for each sub-motor, the speed of rotation is equal to the ratio between the flow-rate and the cylinder capacity. For this reason, the structure of the circuit of the invention couples the primary motor(s) with the secondary motor(s). In general, this coupling results in the speeds of rotation of the primary motors being proportional to, and usually equal to, those of the secondary motors. For example, if a primary motor and a secondary motor having the same cylinder capacities are interconnected via a first series duct and via a second series duct in accordance with the invention, then their speeds of rotation are mutually equal, which can be required for driving same-diameter wheels of a vehicle.

In this text, the term "a series duct" should be understood as being a duct that does not have any bypass (even though a small amount of fluid subtraction or addition might remain possible), at least in a "coupling" configuration, in which it is desired for the primary motor(s) and the secondary motor(s) to be synchronized. Thus, the circuit of the invention can include valves or equipment enabling it to be used in configurations other than the above-indicated coupling configuration in which the primary motor(s) are coupled with the secondary motor(s).

The invention is applicable to a wide diversity of hydraulic circuits. Thus, in the hydraulic circuit of the invention, if N is the total number of primary and secondary motors (the sum of the number of primary motors and of secondary motors), it is possible for each of the motors to have N sub-motors, or for at least one of the primary and secondary motors to have a number of sub-motors that is not equal to N, in particular where N is strictly greater than two (N may be equal to two or greater than two).

In addition, each of the sub-motors of the primary and secondary motors may have the same cylinder capacity; or indeed at least one of the sub-motors of said motors may have a cylinder capacity that is different from the cylinder capacity of another sub-motor. This characteristic may be chosen in particular when each of the N primary and secondary motors has N sub-motors.

In addition, in the circuit of the invention, at least one primary and/or secondary motor may have zero, one, or at least two sub-motors connected directly or suitable for being connected directly (i.e. without being connected via another motor or sub-motor) to a source of fluid under pressure that delivers pressurized fluid to the circuit, e.g. a main pump of the hydraulic circuit.

In an embodiment of the invention, the first sub-motor also has a third main orifice, and the second sub-motor also has a fourth main orifice, and the third and fourth main orifices of said at least one primary motor are connected to the two main orifices of a main pump of the hydraulic circuit.

In an embodiment, in each secondary motor, the first main orifice and the second main orifice are the only main orifices of the secondary motor. The secondary motor is then a motor not comprising a plurality of sub-motors.

In which case, due to the coupling provided by the series ducts, the total cylinder capacity of the first sub-motors of the primary motors should be equal to the total cylinder capacity of the second sub-motors of the primary motors.

In an embodiment, in the hydraulic circuit, said at least one secondary motor comprises two sub-motors, the first of which has said first main orifice of said at least one secondary motor, and the second of which has said second main orifice of said at least one secondary motor. The secondary motor may also be arranged such that its first and second main orifices are those of one of the sub-motors, the other sub-motor exchanging fluid via other orifices, and serving to deliver additional torque to the secondary motor.

In an embodiment, the hydraulic circuit further includes at least one tertiary motor interposed on one of said series ducts, subdividing it into a first segment and into a second segment, so that:
the first segment is connected to a first main orifice of the tertiary motor or of each of the tertiary motors; and
the second segment is connected to a second main orifice of the tertiary motor or of each of the tertiary motors. The presence of the tertiary motor makes it possible to extend the coupling established between the primary and secondary motors, to the tertiary motor(s). This principle can be generalized to any number of motors or of groups of motors interposed on the series ducts.

In an embodiment, the hydraulic circuit includes a single primary motor that comprises exactly two sub-motors.

In an embodiment, the hydraulic circuit includes two primary motors, each of which comprises exactly two sub-motors.

In an embodiment, the hydraulic circuit is arranged in a vehicle, and the primary motor or each of the primary motors is connected to a wheel on a first side of the vehicle, and the secondary motor or each of the secondary motors is connected to a wheel on the opposite side of the vehicle.

In an embodiment, the hydraulic circuit further includes an auxiliary duct suitable for interconnecting the first and second series ducts, and susceptible of enabling the speed of rotation of said at least one primary motor to be decoupled relative to the speed of rotation of said at least one secondary motor. In general, a two-position deactivation valve or equivalent means is/are interposed on the auxiliary duct. When the valve is in one position, it isolates the two segments of the auxiliary duct, and when it is in the other position, it interconnects said segments, optionally via a constriction. It can thus be understood that the circuit can be used: in a coupling configuration in which the auxiliary duct is isolated by the valve, and the coupling is established as provided for in accordance with the invention; and in a decoupling configuration in which the auxiliary duct makes it possible for a certain quantity of fluid to pass from one series duct to the other, thereby reducing or even eliminating the coupling established by the circuit in the coupling configuration between the primary motor(s) and the secondary motor(s).

In a variant of this embodiment, the auxiliary duct is an internal duct of a primary motor or of a secondary motor. This embodiment makes it possible compactly and inexpensively to provide the above-indicated function of reducing or eliminating the coupling.

In an embodiment, at least a first primary motor further comprises at least a third sub-motor that is distinct from the first and second sub-motors. By means of this third sub-motor, it is possible, on the vehicle on which the circuit is arranged, to have torque and a cylinder capacity that are larger on the primary motor that includes the third sub-motor than on other motors. This configuration may be useful when a primary motor has to develop particularly high torque.

This embodiment may be arranged in order to have multiple operating configurations for the circuit. For example, in a variant, the hydraulic circuit further includes a deactivation valve disposed in series on a duct connected to a main orifice of said third sub-motor, by means of which valve said third sub-motor can deliver torque to the motor of which it is part, or can be bypassed. In the preceding sentence, the term "duct" may designate any passage for fluid, e.g. a flexible or rigid pipe, a passage provided inside a casing of a motor, or any other equivalent means.

Two variants of the preceding embodiment may advantageously be implemented. In these two variants, the first sub-motor of said first primary motor has a fluid discharge or fluid feed third main orifice, and said second sub-motor of said first primary motor also has a fluid discharge or fluid feed fourth main orifice, said third and fourth main orifices being distinct from the first and second main orifices.

In the first variant, in the hydraulic circuit, when the valve is in the first position, said third sub-motor is connected to said third and fourth orifices of the first primary motor; whereas when the valve is in the second position, the main orifices of said third sub-motor are put into communication with each other. Thus, when the valve is in the first position, the third sub-motor contributes additional torque to the first and second sub-motors, for the primary motor, and, when the valve is in the second position, the third sub-motor is bypassed.

In the second variant, when the valve is in the first position, the third sub-motor is connected to the third and fourth orifices of the first primary motor, whereas when the valve is in the second position, the third and fourth main orifices of said first primary motor are connected together. It can be understood that, when the valve is in the second position, the third motor is also connected via external orifices of the first primary motor to the main orifices of a source of fluid under pressure.

Thus, when the valve is in the first position, the third sub-motor contributes additional torque to the first and second sub-motors, for the primary motor; when the valve is in the second position, only the third sub-motor is active in the primary motor, the first and second sub-motors being bypassed.

The invention also provides a hydraulic device serving to drive two groups of motors: firstly, at least one primary motor that is to be coupled with at least one secondary motor, and secondly, at least one other primary motor that is to be coupled with at least one other secondary motor. This type of device is used, in particular, for driving the groups of motors that respectively drive the wheels situated on a first side and on a second side of a vehicle.

In which case, an object of the invention is, in each of the groups of motors, to establish coupling of the primary motor(s) with the secondary motor(s), without generating overheating, and while guaranteeing quite uniform distribution of the drive power between the various motors and/or sub-motors, in order to make it possible to achieve excellent drive of the members driven by the motors (i.e. excellent drivability, for a vehicle) with low risk of wheel spin and low wear on the motors.

This object is achieved by the fact that the hydraulic device comprises two hydraulic circuits as defined above, in which circuits the first sub-motor of said at least one primary motor also has a fluid discharge or fluid feed third main orifice, and the second sub-motor of said at least one primary motor also has a fluid discharge or fluid feed fourth main orifice that are distinct from the first and second main orifices; in which device the third and fourth main orifices of the primary motors of the first and second circuits are connected to the main orifices of the same source of fluid under pressure.

BRIEF DESCRIPTION OF THE DRAWINGS

The invention can be well understood and its advantages appear more clearly on reading the following detailed description of embodiments shown by way of non-limiting example. The description refers to the accompanying drawings, in which.

In the figures, identical or analogous elements bear like references, or references differing by a multiple of 100.

MORE DETAILED DESCRIPTION

A first embodiment of a hydraulic transmission circuit of the invention is described below with reference to FIG. 1. This hydraulic transmission circuit is mounted in a three-wheel vehicle (not shown) that it serves to propel.

This circuit 100 comprises a pump portion 102 and a drive portion 104.

The pump portion 102 comprises two main ducts, namely a common feed duct 106 and a common discharge duct 108, which ducts are connected to respective ones of the main orifices of a pump 110.

In order to feed the circuit 100 with fluid, a booster pump 150 is used that is coupled to the pump 110. Said booster pump 150 draws hydraulic fluid from a reservoir 152 and injects it into a feed duct 154. In order to limit the pressure in the feed line 154, a pressure limiter valve 156 is provided that is suitable for connecting the feed duct 154 to the reservoir 152 in the event that a predetermined pressure value is exceeded.

The feed duct 154 is connected via a first check valve 158 to the common feed duct 106, and via a second check valve 159 to the common discharge duct 108. The hydraulic fluid is thus injected, under all circumstances, and if necessary, into that one of the feed or discharge common ducts 106 and 108 that is at the lower pressure at the time in question. Connected in parallel with the check valve 158 and 159, pressure limiter valves 160 and 162 are also provided, so as to limit the pressure in that one of the feed or discharge common ducts 106 and 108 that is at the higher pressure at the instant in question.

The drive portion 104 of the circuit 100 has two "primary" motors 120, 130, and one "secondary" motor 140.

Each of the primary motors has two sub-motors, respectively 122 & 124, and 132 & 134. The sub-motors 122 and 132 are referred to as "first" sub-motors. Each of them has a main orifice of the primary motor in question, O122 and O132, and a third main orifice I122 and I132. In general, in this document, the prefix I (in) denotes a feed orifice, and the prefix O (out) denotes a discharge orifice, when the circuit is in its usual operating mode.

The sub-motors 124 and 134 are referred to as "second" motors. Each of them has a second main orifice of the primary motor in question, I124 and I134, and a fourth main orifice O124 and O134.

Figure 1:
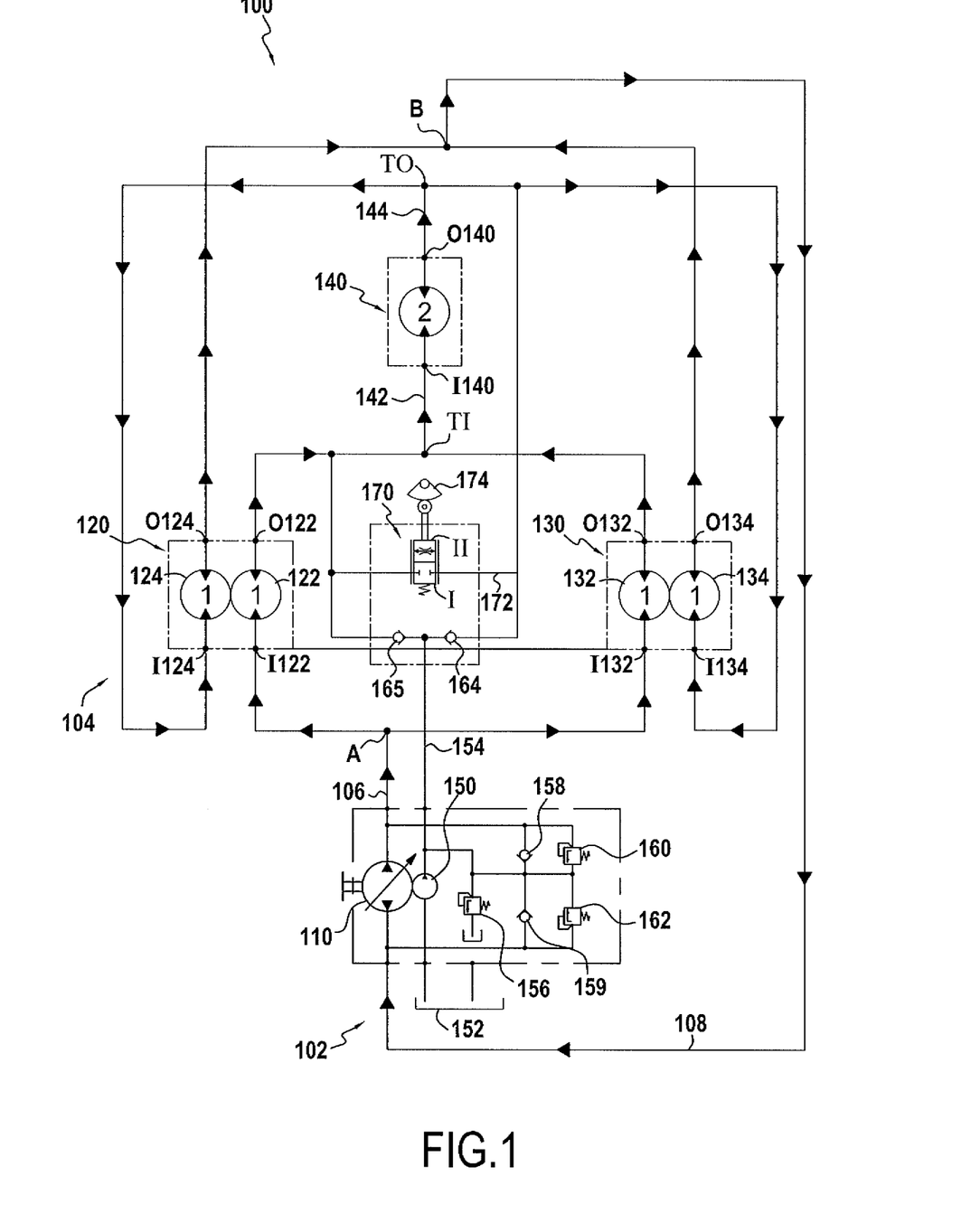
FIG. 1 is a diagrammatic view of a circuit of the invention, including two primary motors and one secondary motor.

The direction of fluid flow, when the circuit 100 is in the usual operating mode, is indicated by the arrows in FIG. 1. In the primary motors 120 and 130, the first, second, third, and fourth main orifices are external orifices.

The secondary motor 140 has two main orifices I140 and O140 that serve respectively as fluid feed and as fluid discharge when the circuit 100 is in the usual operating mode.

The first main orifice O122, O132 of each primary motor 120, 130 is connected to the first main orifice I140 of the secondary motor 140, via a junction TI and via a first series conduct 142.

The second main orifice I124, I134 of each primary motor 120, 130 is connected to the second main orifice O140 of the secondary motor 140 via a second series duct 144, and via a junction TO.

The third main orifice (respectively the orifices I122 and I132) of each primary motor 120, 130 is connected, via a junction A and via the common feed duct 106 to a first main orifice of the pump 110.

The external feed/discharge fourth main orifice (respectively the orifices O124 and O134) of each primary motor 120, 130 is connected, via a junction B and via the common discharge duct 108 to a second main orifice of the pump 110.

The series ducts 142, 144 are connected to the feed duct 154 via check valves 164, 165 that, where applicable, make it possible to maintain a sufficient pressure level in those ducts, thereby compensating for any leaks from the various components. The valves are usually closed and thus do not play any part in the coupling.

In the circuit 100 that is described, the motors 120 and 130 are identical. Thus, their sub-motors have mutually equal cylinder capacities, but the invention may be implemented without their cylinder capacities being equal.

By means of the structure of the circuit of the invention, the series ducts 142, 144 induce coupling between the sub-motors of the primary motors and the secondary motor (optionally, the sub-motors of the secondary motor(s)). In this example, in the circuit 100, this coupling is established in a manner such that the primary motors and the secondary motor rotate at the same speed, when both of the motors 120 and 130 rotate at the same speed. For this purpose, the cylinder capacity of the secondary motor 140 ('2') is equal firstly to the sum of the cylinder capacities ('1') of the sub-motors 122 and 132 of the primary motors to which it is connected via the series duct 142, and secondly to the sum of the cylinder capacities ('1') of the sub-motors 124 and 134 of the primary motors to which it is connected via the series duct 144.

Thus, by means of the series ducts 142 and 144, the speeds of rotation of the primary motors 120, 130, and of the secondary motor 140 are coupled and proportional.

Finally, the circuit 100 also has means for decoupling the secondary motor 140 of the primary motors 120 and 130. It also has an auxiliary duct 172 interconnecting the first and second series duct 142, 144, making it possible to induce decoupling of the speed of rotation of the primary motors 120, 130, relative to the speed of rotation of the secondary motor 140.

A progressive deactivation valve 170 is interposed on the auxiliary duct 172, which valve has two positions, namely a position I in which the valve isolates the two segments of the auxiliary duct, and a position II in which it interconnects them via a constriction. The valve 170 is actuated by an actuator 174. In other embodiments of the invention, the deactivation valve may have more than two positions.

When the valve 170 is in the open position (II), the flow of fluid passing through the auxiliary duct 172 enables the primary motors to operate at a speed that is not proportional to the speed of the motor 140, due to the fact that the flow rate is no longer preserved between the inlets and the outlets of the first and second series ducts.

In extreme circumstances, it is conceivable, for example, for the entire flow rate exiting from the sub-motors 122 and 132 via the series duct 142 to go via the auxiliary duct 172 and for it to be re-directed via the downstream segment of the series duct 144 towards the feed orifices I124 and I134 of the sub-motors 124 and 134. The secondary motor is then stopped, while the motors 120 and 130 could continue to rotate.

Finally, it should be noted that, when the circuit is in the usual operating mode, as shown by the arrows in FIG. 1, the pressure drops from a high pressure at the outlet of the pump, at the junction A, via a high intermediate pressure at the junction TI, then a low intermediate pressure at the junction TO, to reach the low pressure of the pump at the junction B. Thus, the pressure drop is uniform in the circuit, and the drive power is distributed uniformly between the various sub-motors, which all participate in the power transmission.

Figure 2:
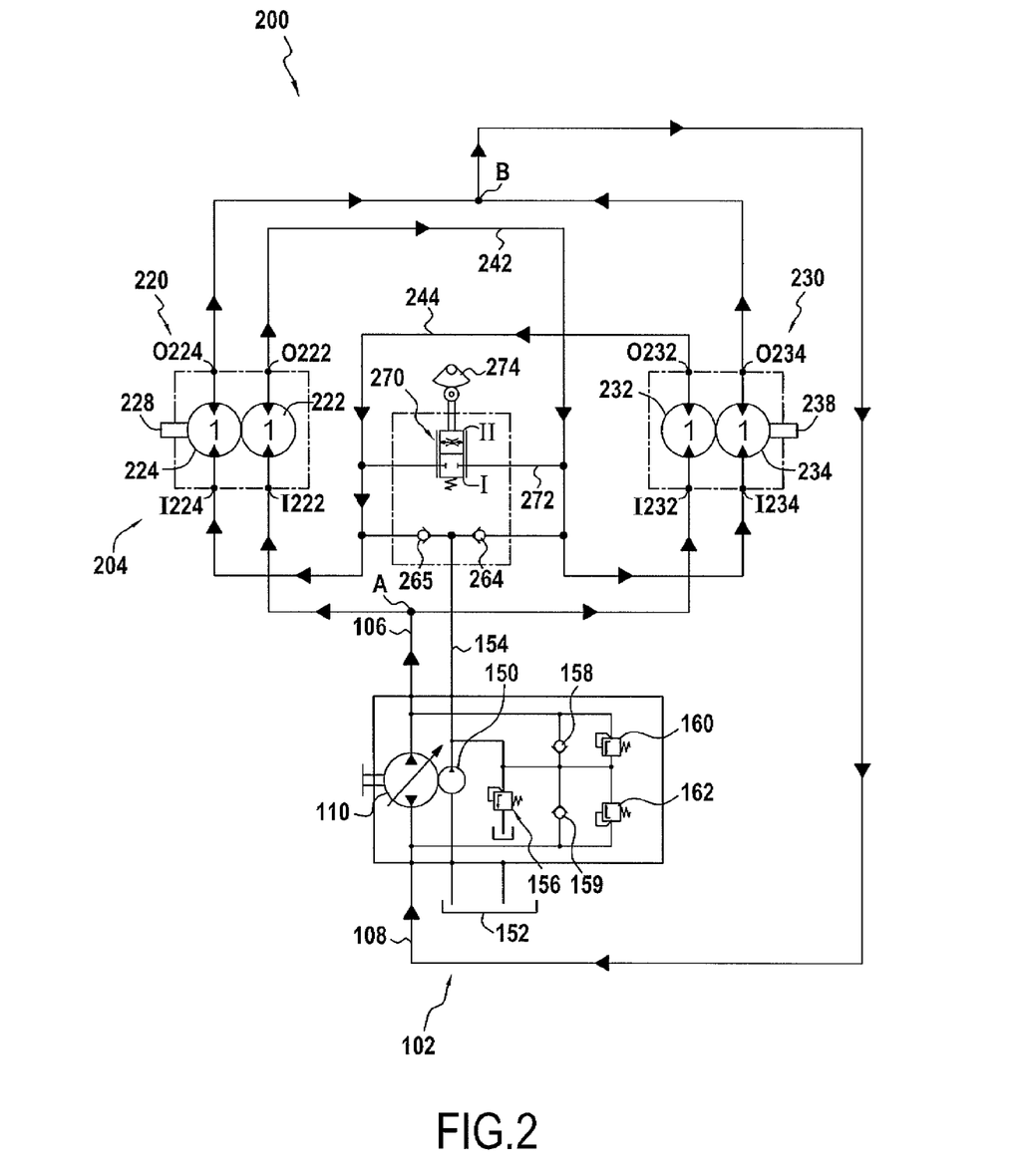
FIG. 2 is a diagrammatic view of a circuit of the invention, including one primary motor and one secondary motor.

A second embodiment of a hydraulic transmission circuit 200 of the invention is described below with reference to FIG. 2.

The hydraulic transmission circuit 200 comprises a pump portion 102 and a drive portion 204. The portion 102 is identical to the pump portion of the circuit 100.

The drive portion 204 of the circuit 200 has a single primary motor 220 and a single secondary motor 230. This embodiment of the invention is somewhat special in that the primary motor and the secondary motor are identical and in that the circuit is arranged symmetrically between the two motors (i.e. it would have been possible to consider that the motor 220 is the secondary motor, and that the motor 230 is the primary motor). In this way, the coupling effected in the invention between the two motors is achieved without there being a preferred motor or a preferred operating direction.

Each of the motors 220, 230 has an outlet shaft 228, 238 that drives a vehicle wheel (not shown).

The primary motor 220 comprises two sub-motors, respectively 222 and 224. Each of the sub-motors has two main orifices. Thus, the first primary motor 220 comprises: a first sub-motor 222 with a first main orifice O222 and a third main orifice I222; and a second sub-motor 224 with a second main orifice I224 and a fourth main orifice O224.

The orifices I222 and I224 are feed orifices when the circuit 200 is in the usual operating mode. The orifices O222 and O224 are discharge orifices when the circuit 200 is in the usual operating mode. The direction of the flow of fluid, when the circuit 200 is in the usual operating mode, is indicated by the arrows in FIG. 2.

The secondary motor 230 also comprises two sub-motors, respectively 232 and 234. Each of these sub-motors is provided with two main orifices I232, I234, O232, O234.

For feeding fluid to the motors 220 and 230, the third main orifice I222 of the primary motor 220, and the main orifice I232 of the secondary motor 230 are connected via a junction A and via the common feed duct 106 to a first main orifice of the pump 110.

For discharging fluid from the motors 220 and 230, the fourth main orifice O224 of the primary motor 220, and the main orifice O234 of the secondary motor 230 are connected, via a junction B and via the common discharge duct 108, to a second main orifice of the pump 110.

The coupling between the primary motor 220 and the secondary motor 230 is achieved in the following manner.

The first main orifice O222 of the primary motor 220 is connected to the main orifice I234 of the secondary motor 234 (first main orifice thereof) via a first series duct 242; in addition, the second main orifice I224 of the primary motor 220 is connected to the main orifice O232 of the secondary motor 230 (second main orifice thereof) via a second series duct 244.

In the circuit 200 shown, the motors 220 and 230 are identical. Their sub-motors have mutually equal cylinder capacities ('1'), but the invention may be implemented without their cylinder capacities being equal, i.e. in each motor, the two sub-motors (222, 224; 232, 234) may have different cylinder capacities.

In the invention, each of the series ducts 242, 244 induces coupling between the sub-motors of the primary motor and of the secondary motor. In the circuit 200, this coupling is achieved such that the primary motor and the secondary motor rotate at speeds that are exactly coupled and proportional (and, in general, equal).

In addition, as in the circuit 100, the speeds of rotation of the primary motor and of the secondary motor may be decoupled in the circuit 200, by means for decoupling the primary motor 220 and the secondary motor 230.

These means comprise an auxiliary duct 272 interconnecting the first and second series ducts 242, 244, on which auxiliary duct a progressive deactivation valve 270 having two positions is interposed. Operation and the role of this duct and of this auxiliary valve are identical to those of the duct 170 and of the valve 172 in the circuit 100, and are not described in detail again below.

A third embodiment of the invention, in the form of a hydraulic transmission device 300, is described below with reference to FIG. 3.

The device 300 is a circuit having four motors 320A, 330A, 320B, 330B. Each of the motors is connected to a wheel (not shown); thus, the device 300 serves to propel a vehicle having four-wheel drive.

The device 300 comprises a drive portion 304 and a pump portion 102. The pump portion 102 is identical to the pump portion of the circuit 100.

The drive portion 304 is subdivided into a left portion 304A and a right portion 304B that are symmetrical, that are disposed respectively on the left and right sides of the vehicle, and that are mounted in parallel with each other.

Since these two portions are symmetrical, only the left drive portion 304A is described in detail below.

This portion 304A forms a sub-circuit (referred to below as the "hydraulic circuit" 304A) that, in itself, constitutes an embodiment of the invention.

Thus, the circuit 304A has a primary motor 320A and a secondary motor 330A.

The primary motor 320A comprises sub-motors 322A and 324A. Each of these two sub-motors has two main orifices. The sub-motor 322A thus has a first main orifice O322A and a third main orifice I322A of the primary motor 320A; the sub-motor 324A has a second main orifice I324A and a fourth main orifice O324A of the primary motor 320A.

Figure 3:
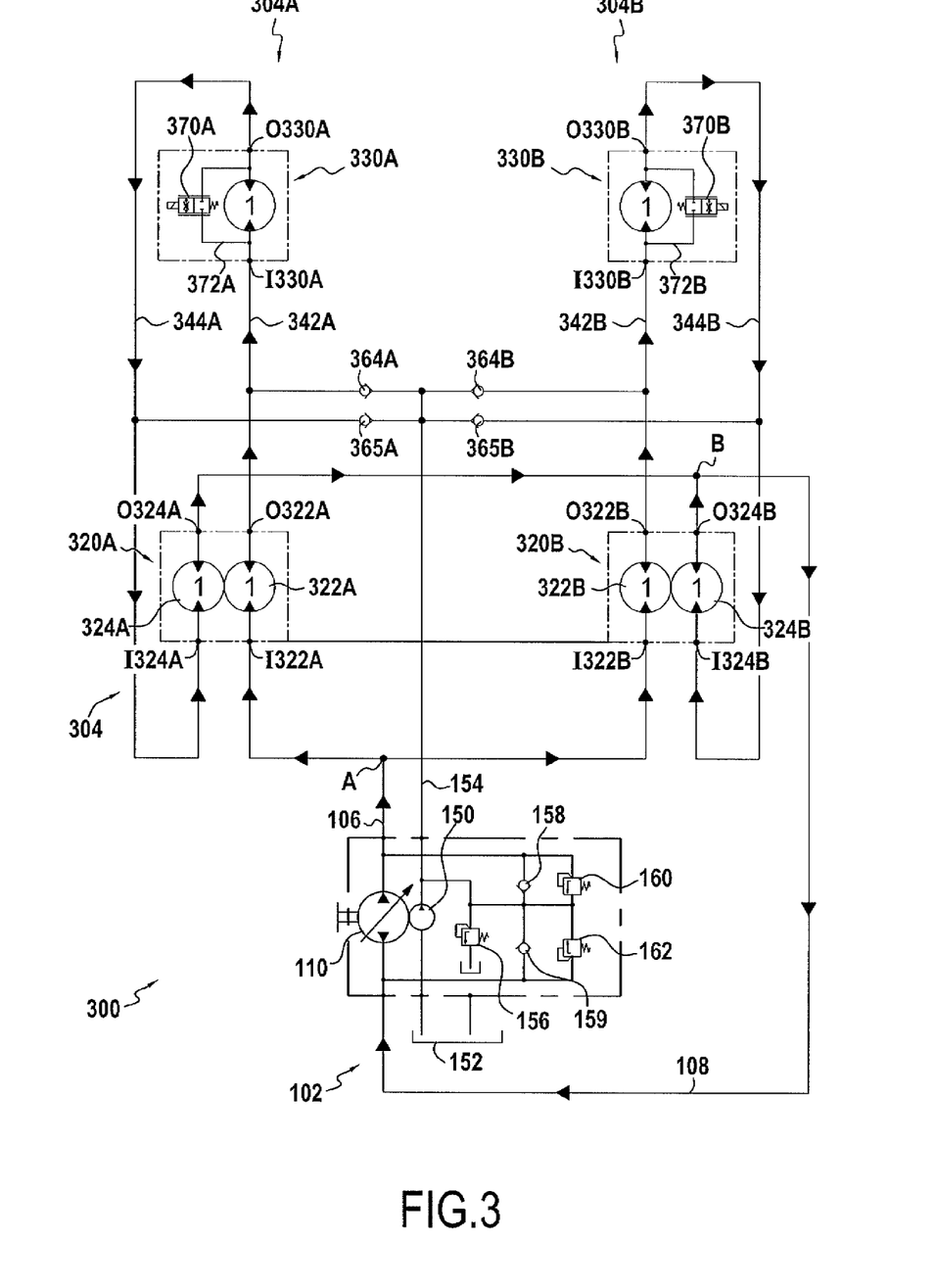
FIGS. 3 to 6 are diagrammatic views of hydraulic devices that unite two hydraulic circuits of the invention, each including one primary motor and one secondary motor, those devices differing from each other by the arrangement of the sub-motors of their primary motors, and/or by the presence of "tertiary" additional motors, in the hydraulic circuits.

The direction of the flow of fluid, when the device 300 is in the usual operating mode, is indicated by arrows in FIG. 3.

The secondary motor 330A is a single motor (not comprising two or more sub-motors). It has a first main orifice and a second main orifice, respectively referenced I330A and O330A, making fluid feed and fluid discharge possible when the circuit 300 is in the usual operating mode.

For feeding fluid to the drive circuit 304A, the third main orifice I322A of the primary motor 320A is connected, via a junction A and via the common feed duct 106, to a first main orifice of the pump 110.

For discharging fluid from the drive circuit 304A, the fourth main orifice O324A of the primary motor 320A is connected via a junction B and via the common discharge duct 108 to a second main orifice of the pump 110.

The coupling between the primary motor 320A and the secondary motor 330A is achieved in the following manner.

The first main orifice O322A of the primary motor 320A is connected to the first main orifice I330A of the secondary motor 330 via a first series duct 342A.

The second main orifice I324A of the primary motor 320A is connected to the second main orifice O330A of the secondary motor 330A via a second series duct 344A.

The junctions A and B are the points at which the common feed and discharge ducts 106 and 108 are connected respectively via secondary feed ducts of the circuits 304A and 304B to the orifices I322A, I322B, for feed, and O324A, O324B for discharge, of the primary motors 320A and 320B.

The series ducts 342A and 342B, 344A and 344B are connected to the feed duct 154 via check valves 364A, 364B, 365A, and 365B.

It should also be noted that, in order to enable the circuit 304A to operate, the sub-motors 322A and 324A, and the motor 330A, are necessarily of the same cylinder capacity, referenced '1' (assuming that the primary motor 320A and the secondary motor 330A are designed to rotate at the same speed).

In general, by means of the coupling between the primary motor and the secondary motor, the speeds of rotation of the motors 320A and 320B firstly, and 330A and 330B secondly, are maintained proportional.

Finally, as in the circuits 100 and 200, in each circuit 304A, 304B, the relative speeds of the primary motor and of the secondary motor can be decoupled.

For this purpose, the motor 330A (like the motor 330B) has an internal auxiliary duct 372A, and a two-position auxiliary deactivation valve 370A that is a progressive solenoid valve. This auxiliary duct interconnects the series ducts 342A and 344A. Operation and the role of this auxiliary duct and of this auxiliary valve are identical to those of the duct 170 and of the valve 172 in the circuit 100, and are not described in detail again below.

Figure 4:
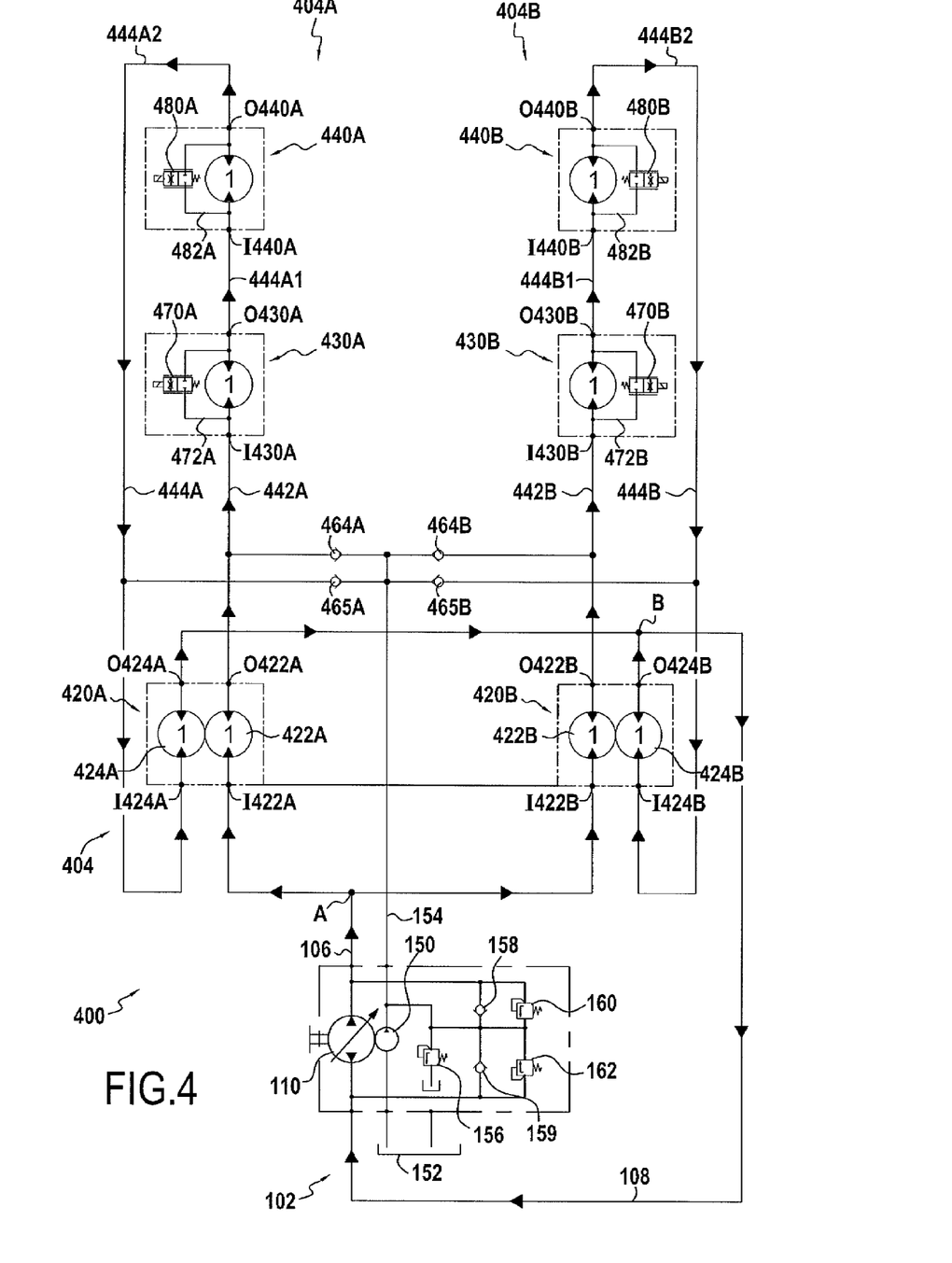

Another hydraulic transmission device 400 is described below with reference to FIG. 4.

This device 400 is very similar to the device 300. However, each circuit 404A, 404B has not only a primary motor and a secondary motor that are coupled together, but also a tertiary motor coupled to the first two motors.

The device 400 is implemented by interposing a respective tertiary motor 440A or 440B on each of the second series ducts 444A and 444B of the circuits 404A and 404B. Thus, on the circuit 404A, the tertiary motor 440A that is interposed subdivides the series duct 444A into a first segment 444A1 and a second segment 444A2.

The first segment 444A1 is connected to a first main orifice I440A of the tertiary motor 440A; and the second segment 444A2 is connected to a second main orifice O444A of the tertiary motor 440A.

The tertiary motor 440A is a motor identical to the motor 430A. Like that motor, it has an auxiliary duct 482A with a two-position auxiliary deactivation valve 480A making it possible to decouple or to declutch it from the other motors.

Interposing the motors 440A and 440B on the second series ducts may, for example, make it possible to have a hydraulic device enabling six wheels to be driven, instead of four for the circuit 300, i.e. two additional wheels. On each side of the vehicle on which the circuit 400 is arranged, the circuit makes it possible to couple three wheels, both on the left and on the right.

Naturally, the tertiary motors that are added may be different from the secondary motors. They may, for example, be motors having a plurality of sub-motors each.

Figure 5:
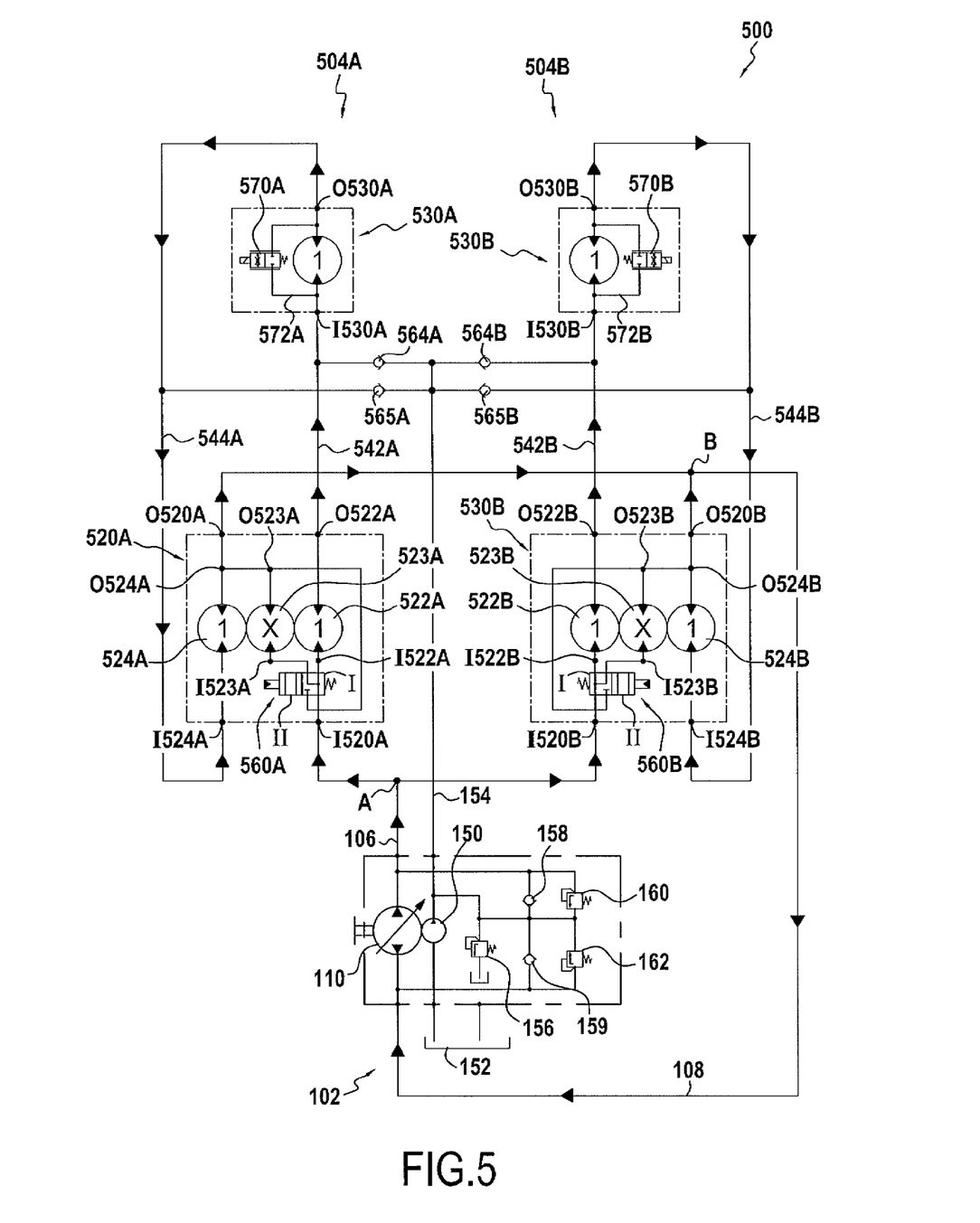
Figure 6:
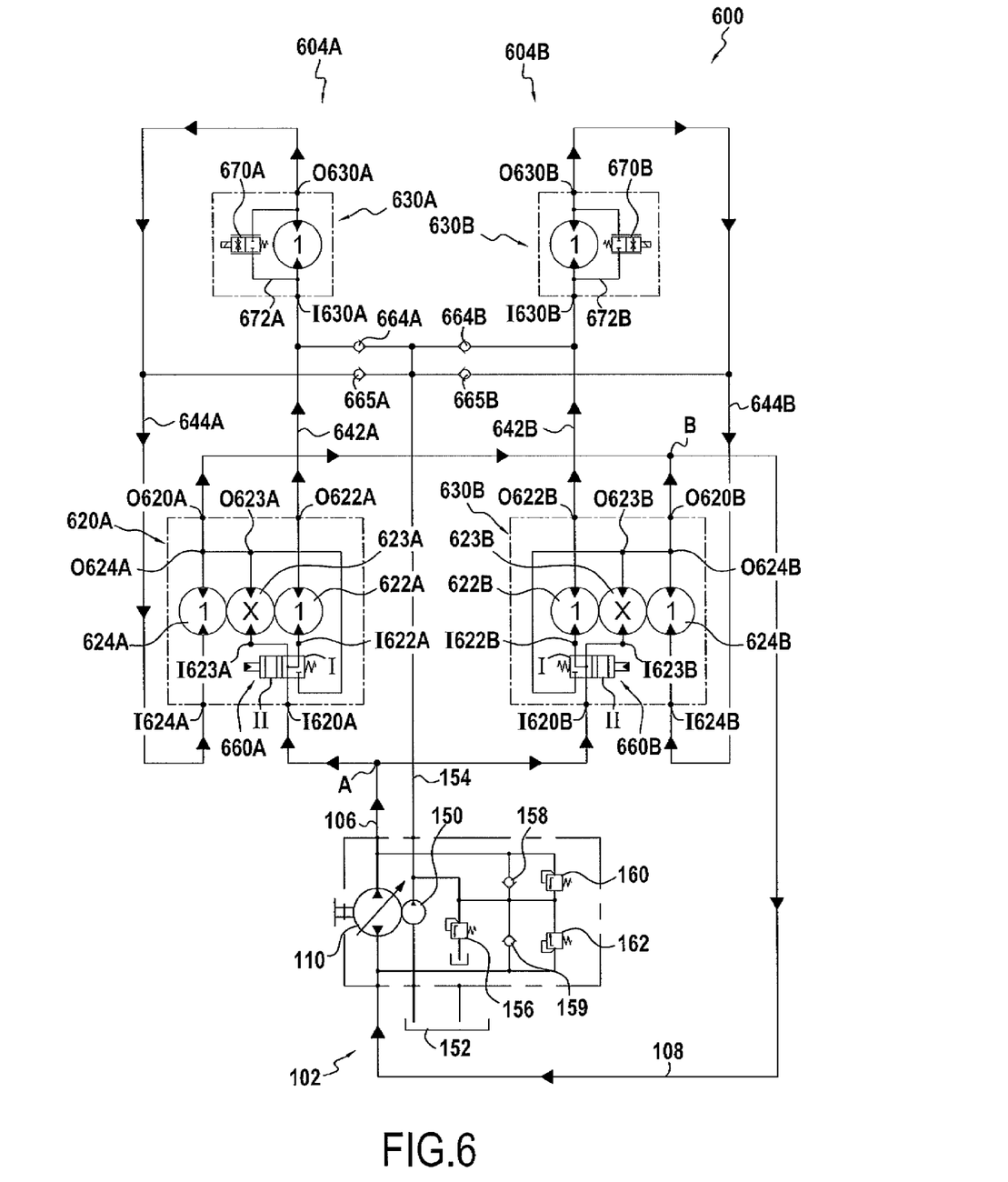

Two variants of the hydraulic device 300 shown in FIG. 3 are described below with reference to FIGS. 5 and 6. These variants differ from the device 300 by the type of primary motor used.

A first variant of the device 300 forming a hydraulic device 500 is described in detail below with reference to FIG. 5.

In the device 500, the primary motor 520A (and 520B) of the circuit 504A (analogous to the circuit 304A) is different from the primary motor 320A of the circuit 304A. Nevertheless, like the motor 320A, it has four external feed/discharge orifices I520A & I524A and O522A, O520A.

Conversely, unlike the motor 320A, the motor 520A has three distinct sub-motors 522A, 523A, 524A, instead of two.

The first and the second sub-motors 522A and 524A respectively have first and third main orifices O522A and I522A, and second and fourth main orifices I524A and O524A. The first and second orifices O522A and I524A are orifices that are external to the motor. The third and fourth main orifices I522A and O524A are internal orifices.

The sub-motor 523A has two main orifices I523A and O523A. The orifice O523A is connected to the main orifice O524A of the sub-motor 524A, which is itself connected to an external main orifice O520A of the primary motor 520A.

In addition, the primary motor 520A has a hydraulic valve 560A having two positions I and II. This valve 560A has two pairs of orifices connected respectively:
- on a first side, to the orifice O520A and to another external orifice I520A of the motor 520A; and
- on a second side, to the third main orifice I522A of the sub-motor 522A, and to the second main orifice I523A of the sub-motor 523A.

When the valve 560A is in the position I (FIG. 5), the external orifice I520A of the motor 320A is put into communication with both of the orifices I523A and I522A, the orifice O520A not being put into communication via the valve 560. Thus, in this position, the sub-motor 523A delivers torque that is complementary to the respective torques developed by the sub-motors 522A and 524A of the motor 520A. The coupling between the primary motor 520A and the secondary motor 330A is identical to the coupling obtained in the device 300. The flow passing through the sub-motor 523A does not pass through the ducts used for the coupling between the primary motor 520A and the secondary motor 330A; thus, the cylinder capacity of the sub-motor 523A can be any cylinder capacity "X", and can differ from the common cylinder capacity "1" of the sub-motors 522A and 524A.

When the valve 560 is in the second position II, the orifices I520A and I522A are put into communication, and the orifices I523A and O523A are put into communication. In this position, the sub-motor 523A is thus bypassed, and the device 500 operates in a manner identical to the manner in which the device 300 operates.

Another variant of the hydraulic device 300, in the form of a hydraulic transmission device 600, is described below with reference to FIG. 6.

The device 600 is very similar to the device 500. The only difference lies in the arrangement of the valves 660A and 660B.

The valve 660A is analogous to the valve 560A. Thus, its orifices are connected to the same orifices of the primary motor 620A or of its sub-motors as the valve 560A of the primary motor 520A of the circuit 500.

Conversely, the internal arrangement of the valve 660A is specific. In its two respective positions I and II, the valve 660A puts the orifices into communication as follows:

In its first position I, it connects the two main orifices I622A and I623A to the external main orifice I620A, whereas the other main orifice O623A of the sub-motor 623A is connected to the external main orifice O620A of the motor 620A, and the valve 660A does not establish any communication between the orifices, firstly O623A and O624A, and secondly I622A and I623A.

In this position, in the same way as for the device 500, the sub-motor 623A contributes by the torque that it develops to the torque developed by the motor 620A; its cylinder capacity X, which can be of any value, is added to the cylinder capacity of the sub-motors 622A and 624A.

In its second position, the valve 660A firstly puts the main orifice I622A into communication with the main orifices O624A, O620A, and O623A. Secondly it puts the main orifice I623A into communication with the external main orifice I620A of the motor 620A.

As a result, the sub-motors 622A and 624A, and thus the secondary motor 630A, are bypassed. The motor 620A is then driven by the sub-motor 623A alone, and the motor 630A is no longer driven.

This position of the valves 660A and 660B makes it possible for the device 600 to have an operating mode in which there is no longer any coupling between the primary motors and the secondary motors, the secondary motors no longer delivering drive. The vehicle then operates with two driven wheels only.

What is claimed is:

1. A hydraulic circuit including:
   at least one primary motor comprising at least first and second distinct sub-motors, the first sub-motor having a feed or discharge first main orifice, and the second sub-motor having a feed or discharge second main orifice; and
   at least one secondary motor;
   in which circuit said first main orifice of said at least one primary motor is connected to a first main orifice of said at least one secondary motor via a first series duct;
   wherein:
   said second main orifice of said at least one primary motor is connected to a second main orifice of said at least one secondary motor via a second series duct.

2. A hydraulic circuit according to claim 1, wherein the first sub-motor also has a third main orifice, and the second sub-motor also has a fourth main orifice, and the third and fourth main orifices of said at least one primary motor are connected to the two main orifices of a main pump of the hydraulic circuit.

3. A hydraulic circuit according to claim 1, wherein in each secondary motor, the first main orifice and the second main orifice are the only main orifices of the secondary motor.

4. A hydraulic circuit according to claim 1, wherein said at least one secondary motor comprises two sub-motors, the first of which has said first main orifice of said at least one secondary motor, and the second of which has said second main orifice of said at least one secondary motor.

5. A hydraulic circuit according to claim 1, further including at least one tertiary motor interposed on one of said series ducts, subdividing it into a first segment and into a second segment, so that:
   the first segment is connected to a first main orifice of the tertiary motor or of each of the tertiary motors; and
   the second segment is connected to a second main orifice of the tertiary motor or of each of the tertiary motors.

6. A hydraulic circuit according to claim 1, including a single primary motor that comprises exactly two sub-motors.

7. A hydraulic circuit according to claim 1, including two primary motors, each of which comprises exactly two sub-motors.

8. A hydraulic circuit according to claim 1, arranged in a vehicle, wherein the primary motor or each of the primary motors is connected to a wheel on a first side of the vehicle, and the secondary motor or each of the secondary motors is connected to a wheel on the opposite side of the vehicle.

9. A hydraulic circuit according to claim 1, further including an auxiliary duct suitable for interconnecting the first and second series ducts, and susceptible of enabling the speed of rotation of said at least one primary motor to be decoupled relative to the speed of rotation of said at least one secondary motor.

10. A hydraulic circuit according to claim 9, wherein said auxiliary duct is an internal duct of a primary motor or of a secondary motor.

11. A hydraulic motor according to claim 1, wherein at least a first primary motor further comprises at least a third sub-motor that is distinct from the first and second sub-motors.

12. A hydraulic circuit according to claim 11, further including a deactivation valve disposed in series on a duct connected to a main orifice of said third sub-motor, by means of which valve said third sub-motor can deliver torque to the motor of which it is part, or can be bypassed.

13. A hydraulic circuit according to claim 12, wherein:
said first sub-motor of said first primary motor also has a fluid discharge or fluid feed third main orifice, and said second sub-motor of said first primary motor also has a fluid discharge or fluid feed fourth main orifice, said third and fourth main orifices being distinct from the first and second main orifices;
when the valve is in the first position, said third sub-motor is connected to said third and fourth orifices of the first primary motor;
when the valve is in the second position, the main orifices of said third sub-motor are put into communication with each other.

14. A hydraulic circuit according to claim 12, wherein:
said first sub-motor of said first primary motor also has a fluid discharge or fluid feed third main orifice, and said second sub-motor of said first primary motor also has a fluid discharge or fluid feed fourth main orifice, said third and fourth main orifices being distinct from the first and second main orifices;
when the valve is in the first position, said third sub-motor is connected to said third and fourth orifices of the first primary motor;
when the valve is in the second position, the third and fourth main orifices of said first primary motor are connected together.

15. A hydraulic device comprising two hydraulic circuits each according to claim 1, in which circuits the first sub-motor of said at least one primary motor also has a fluid discharge or fluid feed third main orifice, and the second sub-motor of said at least one primary motor also has a fluid discharge or fluid feed fourth main orifice that are distinct from the first and second main orifices; in which device the third and fourth main orifices of the primary motors of the first and second circuits are connected to the main orifices of the same source of fluid under pressure.

* * * * *